(12) United States Patent
Scharlach

(10) Patent No.: US 10,615,665 B2
(45) Date of Patent: Apr. 7, 2020

(54) ELECTRIC MACHINE

(71) Applicant: AUDI AG, Ingolstadt (DE)

(72) Inventor: Albert Scharlach, Oberdolling (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 15/816,514

(22) Filed: Nov. 17, 2017

(65) Prior Publication Data

US 2018/0145562 A1 May 24, 2018

(30) Foreign Application Priority Data

Nov. 21, 2016 (DE) .................. 10 2016 222 846

(51) Int. Cl.
| | | |
|---|---|---|
| *H02K 1/32* | (2006.01) | |
| *H02K 9/00* | (2006.01) | |
| *H02K 15/02* | (2006.01) | |
| *H02K 15/09* | (2006.01) | |

(52) U.S. Cl.
CPC .............. *H02K 9/005* (2013.01); *H02K 1/32* (2013.01); *H02K 15/024* (2013.01); *H02K 15/09* (2013.01)

(58) Field of Classification Search
CPC .................................. H02K 1/32; H02K 9/005
See application file for complete search history.

(56) References Cited

U.S. PATENT DOCUMENTS

| | | | | |
|---|---|---|---|---|
| 4,286,183 A * | 8/1981 | Montgomery | ........... | H02K 9/04 310/62 |
| 4,499,660 A | 2/1985 | Lenz | | |
| 8,928,195 B2 * | 1/2015 | Ohashi | ...................... | H02K 1/32 310/54 |
| 2009/0058204 A1* | 3/2009 | Sirois | ....................... | H02K 1/20 310/59 |
| 2013/0020889 A1 | 1/2013 | Yamamoto et al. | | |
| 2015/0280525 A1 | 10/2015 | Rippel et al. | | |
| 2016/0028284 A1 | 1/2016 | Dajaku | | |
| 2016/0036276 A1 | 2/2016 | Yamagishi et al. | | |

FOREIGN PATENT DOCUMENTS

| | | |
|---|---|---|
| CN | 103563219 A | 2/2014 |
| CN | 103986263 A | 8/2014 |
| CN | 105009421 A | 10/2015 |
| CN | 105305667 A | 2/2016 |
| CN | 105377693 A | 3/2016 |
| DE | 19542962 C1 | 11/1996 |
| DE | 102013020331 A1 | 7/2014 |

(Continued)

OTHER PUBLICATIONS

European Search Report dated Apr. 10, 2018 of corresponding European application No. 17197710.1; 9 pgs.

(Continued)

*Primary Examiner* — Dang D Le

(74) *Attorney, Agent, or Firm* — Maier & Maier, PLLC

(57) ABSTRACT

An electric machine, with a stator and a rotor. The rotor is provided with a sheet metal packet fixed to the rotor shaft of the electric machine having sheet metal plates stacked in the axial direction of the rotor. The sheet metal packet and at least one short-circuit ring arranged on an axial side of the sheet metal plate form at least one cooling channel for a cooling fluid which extends at least in sections in the radial direction of the rotor.

7 Claims, 4 Drawing Sheets

(56) References Cited

FOREIGN PATENT DOCUMENTS

| DE | 102013214082 A1 | 1/2015 |
|---|---|---|
| DE | 102014018223 A1 | 6/2015 |
| DE | 102014110299 A1 | 1/2016 |
| JP | S55-120254 U | 8/1980 |
| JP | S61-165055 U | 10/1986 |
| JP | S62-44659 U | 3/1987 |
| JP | 2008-228522 A | 9/2008 |
| JP | 2010-263757 A | 11/2010 |
| JP | 2014-050219 A | 3/2014 |
| WO | 2014140709 A2 | 9/2014 |

OTHER PUBLICATIONS

German Search Report dated May 24, 2017 of corresponding German application No. 102016222846.3; 6 pgs.
Office Action dated May 20, 2019, in corresponding Chinese Application No. 201711160491.6; 18 pages.
Office Action dated Dec. 3, 2019, in corresponding Chinese Application No. 201711160491.6; 17 pages.

\* cited by examiner

ELECTRIC MACHINE

FIELD

The invention relates to an electric machine comprising a stator and a rotor, wherein the rotor comprises a sheet metal packet which is attached to a rotor shaft of the electric machine and which comprises sheet metal plates stacked in the axial direction of the rotor. In addition, the invention also relates to a motor vehicle, as well as to a method for manufacturing a rotor of an electric machine.

BACKGROUND

Electric machines that can receive high outputs as generators and/or provide high outputs as engines are used for many applications. For example, corresponding electric machines in motor vehicles are used as a part of hybrid drive, or as a drive machine with a purely electric drive. If a high output density is to be achieved, it may be necessary to cool the electric machine. A number of approaches are known that can be used for this purpose, for example cooling of the stator of the electric machine with a cooling jacket, which can be for example designed so that a water stream passes through it in order to cool the stator of the electric machine.

In particular in the case of asynchronous machines, it is possible that the rotor of the electric machine will heat up strongly. If the rotor is cooled only by the ambient air, which is to say for example via the air gap between the rotor and the stator and/or the front surfaces of the rotor, sufficient cooling, in particular cooling of the inner region of the rotor, can be often achieved only to a limited extent.

SUMMARY

The objective of the invention is therefore to improve the cooling of a rotor of an electric machine.

This objective is achieved according to the invention with an electric machine of the type mentioned in the introduction, wherein a sheet metal packet and/or at least one short-circuit ring arranged on an axial side of the sheet metal packet form at least one cooling channel for a cooling fluid, which extends at least in sections in the radial direction of the rotor.

According to the invention, it is proposed that at least one cooling channel is provided, which passes radially through the sheet metal packet, or through the short-circuit ring arranged on it. This makes it possible to guide the cooling fluid, in particular a gas and/or a fluid, through the sheet metal packet and/or through the short-circuit ring in order to cool the rotor from within. The waste heat generated in the rotor can thus be discharged directly from the area in which it is generated. The cooling of the rotor can thus be improved in this manner and the performance of the electric machine can be increased.

It is possible that the cooling channel is extended exclusively through the sheet metal packet, exclusively through the short-circuit ring, or even both through the sheet metal packet and through the short-circuit ring. It is preferred when a plurality of cooling channels are provided, which pass radially through the components of the rotors, at least in sections. The cooling fluid can be for example air or oil. In this case it is also possible that separate cooling channels are provided for the different cooling fluids. For example, a cooling channel or a plurality of cooling channels can be provided through which is guided a fluid, for example oil, and one or several cooling channels can be provided through which is guided a gas, for example air.

The electric machines can be an asynchronous machine. The sheet metal packet can support the current-conducting elements of the rotor, for example rods made of coppery, aluminum, or the like. Short-circuit rings which short-circuit the current-conducting elements can be preferably provided in the axial direction of the rotor on both sides of the sheet metal packet. A corresponding construction of the asynchronous machine is known from prior art, apart from the proposed cooling channels.

The cooling channel can be provided with at least one section which extends in the circumferential direction and/or in the axial direction of the rotor. The at least sectional guiding of the cooling channel in radial direction can be beneficial for conveying the cooling fluid in the cooling channel because with conveying of the cooling fluid to the outer edge of the rotor, the centrifugal force occurring with the rotation of the rotor can be used for fluid transport purposes. With the additional arrangement of the cooling channels in the circumferential direction and/or in the axial direction, the length of the cooling channels can be increased so that the exchange of heat between the cooling fluid and the rotor can be improved.

The cooling channel can be provided at least with one branching of channels and/or a combination of partial channels, which is to say that the cooling fluid can be distributed within the cooling channels between a plurality of partial channels and/or cooling fluids that can then be reunited again in one cooling channel.

Within the context of the manufacturing of the electric machine, it is possible that the cooling channel is introduced with the machining of the already assembled sheet metal packet. However, the manufacturing can be simplified by introducing recesses and/or openings into the individual sheet metal components which form the cooling channels before the stacking of the sheet metal packet.

The cooling channel can be delimited by at least two sheet metal plates of the sheet metal packet and/or the short-circuit ring, and it can thus be provided with at least two axially adjacent disks which delimit the cooling channel. In particular if the cooling channels are to be angled, it may be expensive if the corresponding cooling channels are introduced into a short-circuit ring that is manufactured in one part, or into a sheet metal packet that has been already assembled.

The manufacturing can be simplified when the individual metal sheet plates of the metal sheet packet and/or the disks, which will after the assembly form the short-circuit ring, are processed prior to assembling them together to form the sheet metal packet or short-circuit ring. In this case, the individual disks and/or sheet metal plates can be perforated with a relatively small expense and/or recesses can be created in the sheet metal plates or disks. A cooling channel can thus be formed with a desired form with a corresponding arrangement of the recesses and/or of the perforations, and with a corresponding selection of the orientation of the individual sheet metal plates or disks during their assembly in order to create the sheet metal packet or the cooling channel.

The cooling change can be formed in such a way that a plurality of sheet metal plates are provided with at least one perforation in the axial direction of the rotor. In particular, the section or at least one of the sections of the cooling channel arranged in the radial direction of the rotor is formed with such a perforation. At least two sheet metal plates can differ from each other with respect to the number and/or the form and/or the position and/or the orientation of at least parts of their perforations, wherein the cooling channel is formed with perforations of these sheet metal plates. In particular, the sheet metal plates with mutually different perforations can be arranged axially adjacent to each other. In this case, the individual perforations or parts of the perforations in individual metal sheet plats can overlap in the circumferential direction or in the axial direction so that a fluid exchange between these perforations is possible.

In a particularly preferred embodiment, the side walls of the cooling channel, or of one section of the cooling channel, are formed by at least four sheet metal plates. In this case, a second and a third sheet metal plate, which can be arranged between a first and a fourth sheet metal plate, are respectively provided with perforations through which the cooling channel is formed.

In sections in which only the second sheet metal is perforated, the walls of the cooling channels are formed by the limits of the perforation of the second sheet metal plates, as well as by the first and by the third sheet metal plate. In sections in which only the third sheet metal plate is perforated, the side wall of the cooling channel are formed by the limit of the perforation of the third sheet metal plate, as well as by the second and by the fourth sheet metal plate. An exchange of fluid between the sections in which only the second sheet metal is perforated, and in sections in which only the third sheet metal plate is perforated, is possible through the sections in which both the second as well as the third sheet metal plate are perforated. The illustrated example can obviously be further developed in various ways. For example, instead of using individual sheet metal plates, stacks of two or more identical sheet metal plates which are oriented in the same direction can be used. In addition, a cooling channel can be formed by perforations in more than two plates, so that the cooling channel can be guided in the axial direction of the rotor.

The cooling channel or at least one of the cooling channels can extend from a radially internally arranged inner jacket of the sheet metal packet or of the short-circuit ring to a radially externally arranged outer jacket surface of the sheet metal packet or of the short-circuit ring. The cooling channel can thus connect an inner jacket of the rotor to the outer jacket of the rotor, whereby an efficient flow through the rotor can be achieved in the by using centrifugal force. The cooling fluid can be supplied to the cooling channel from the sides of the rotor shaft, for example via a rotor shaft that is designed as a hollow shaft, or via a groove created between the rotor shaft and the groove between the rotor shaft and the sheet metal packet and/or the sheet metal packet. The cooling fluid can be guided into the gap between the rotor and the stator, or adjacent to it on the outer jacket surface. If a gas is used as a cooling fluid, the introduction of the cooling fluid into the gap is additionally used to blow it out from the lubricant, or to blow out another used fluid cooling fluid and thus to improve the rotational properties of the electric machine.

An axially extending cooling line can be built inside the rotor shaft and/or between the rotor shaft and the sheet metal packet and/or inside the sheet metal packet, by means of which the cooling fluid can be supplied to the cooling channel. If the supplying of the cooling fluid is carried out on the inner jacket, then it can be carried out as explained above, in particular through a rotor shaft and/or a groove-shaped opening of the sheet metal package.

The electric machine can be provided with a circulation device by means of which the cooling fluid can be circulated through the cooling channel. The circulation device may comprise one or several blowers which are arranged in an interior space of a housing of the electric machine and which circulate a cooling fluid in its interior space. However, the circulation device may be also a pump, which pumps gaseous and/or liquid cooling fluid to the cooling channel or suctions it off from the channel. For example, the cooling fluid can be pumped to the cooling channel or suctioned off from it via a rotor shaft designed as a hollow shaft.

At least two cooling channels or groups of channels can be provided in the electric machine according to the invention, to which different cooling fluids can be supplied. The electric machine can be designed in such a way that different cooling fluids are supplied to these cooling channels. In particular, a gaseous cooling fluid can be supplied to one of the cooling channels or to a group of the cooling channels. This can be realized for example so that one of the cooling fluids is guided via a rotor shaft to the sheet metal packet, and the other cooling fluid is supplied through an opening of the sheet metal packet on the axial side, or through a groove created between the rotor shaft and the sheet metal packet.

In addition to the electric machine according to the invention, the invention also relates to a motor vehicle which comprises the electric machine according to the invention.

Furthermore, the invention relates to a method for producing a rotor of an electric machine, wherein several sheet metal plates are provided so that the sheet metal plates are stacked in a sheet metal packet arranged on a rotor shaft, wherein a respective current-conducting element is introduced in several perforations formed by recesses created through the sheet metal plates, wherein the sheet metal places are stacked in such as way that at least two adjacent sheet metal plates have a mutually different number and/or form and/or position and/or orientation of at least parts of their perforations, and/or wherein the sheet metal plates are stacked so that they are mutually rotated relative to each other, wherein a cooling channel is formed for the cooling fluid by another part of the perforations which extends at least in sections in the radial direction of the rotor.

In addition, at least one short-circuit ring can be arranged on the sheet metal packet within the context of the manufacturing of the rotor, so that the current-conducting elements are short-circuited. The short-circuit ring can be in particular assembled from several disks which are provided with recesses and/or perforations that form a cooling passage section continuing in the cooling channel and/or a further cooling section.

As was already mentioned with respect to the electric machine according to the invention, the manufacturing of the rotor by using metal sheet plates with corresponding perforations, or by producing it from a plurality of disks assembled together with short-circuit rings, can be done in a very simple manner. It goes without saying that the method according to the invention can be developed with the features explained in the context of the electric machine and vice versa so as to achieve the advantages mention with respect to the individual features.

BRIEF DESCRIPTION OF THE FIGURES

Further advantages and details of the invention will become apparent from the following embodiments and the accompanying figures. The figures schematically illustrate the following.

DETAILED DESCRIPTION OF THE FIGURES

Figure 1:
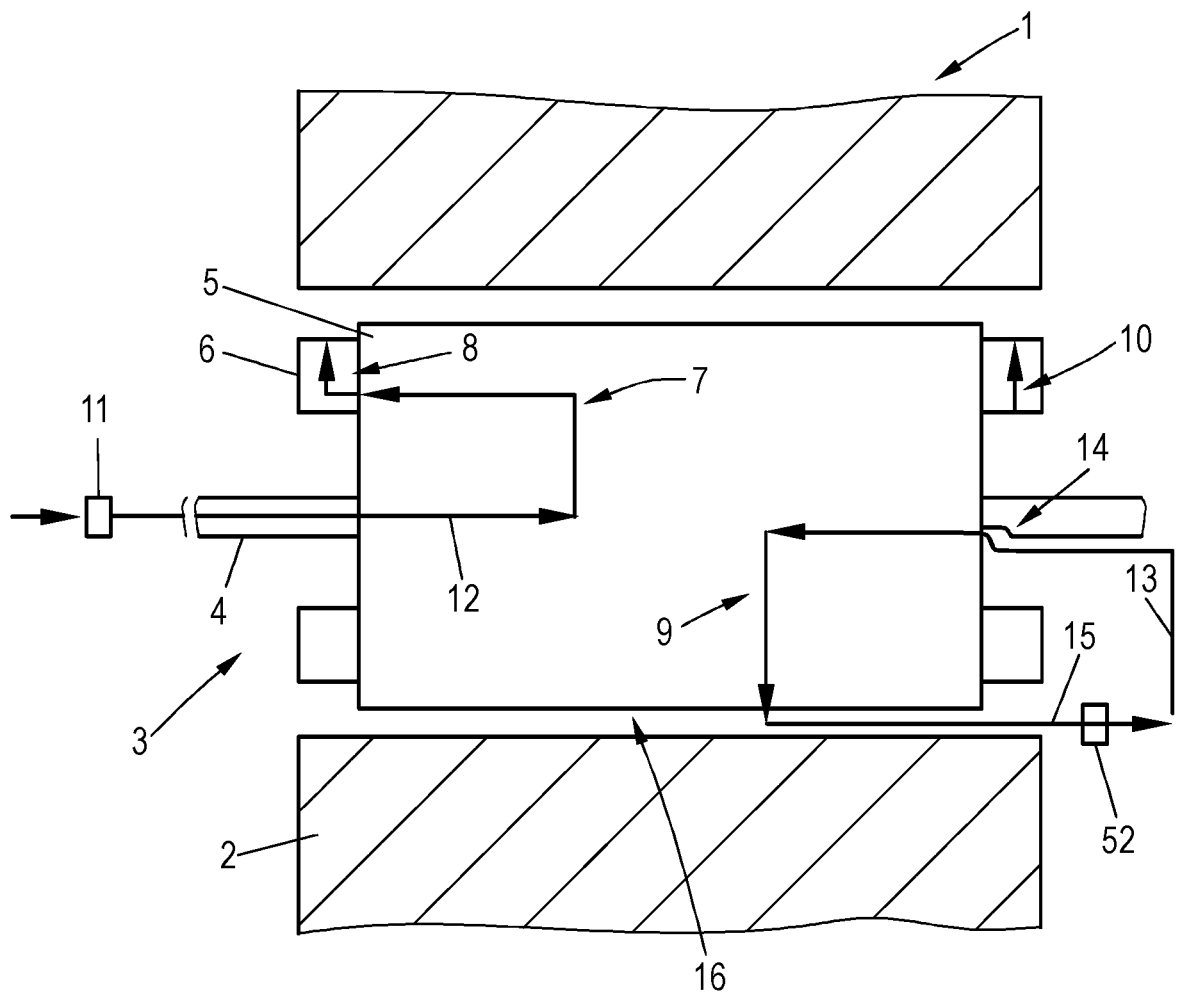
FIG. 1 shows an embodiment of the electric machine according to the invention.

FIG. 1 schematically illustrates an electric machine 1 provided with a stator 2 and a rotor 3. The rotor 3 comprises a sheet metal packet 5 attached to a rotor shaft 4, as well as short-circuit rings 6 arranged axially on the front surfaces of the sheet metal packet 5. The short-circuit rings 6 serve to support current-conducting elements of the rotor 3, not shown, carried by the sheet metal packet 5, in which currents can be induced by reels, not shown in the figure, in order to build up a magnetic field on the side of the rotor.

In order to cool the interior space of the rotor 3, multiple cooling channels are provided in the metal sheet packet 5 and in the short-circuit rings are provided multiple cooling channels 7, 8, 9, 10 for cooling fluid which extend at least in sections in the radial direction of the rotor. The cooling channels 7 through 10 are schematically illustrated by arrows in FIG. 1. Different possibilities for concrete constructions of the cooling channels will be discussed later with reference to FIG. 2 through 6.

The electric machine 1 can be designed in such a way that the various channels supplying at least partially different cooling fluids can be conducted through the cooling channels 7 through 10. For example, a fluid coolant, in particular oil, can be conducted through the rotor 3, and gaseous cooling fluid can be conducted through the cooling channels 9, 10, in particular ambient air.

In order to supply cooling fluid to the cooling channels 7, 8, the cooling fluid is first conducted through the rotor shaft 4 which is constructed as a hollow shaft. For this purpose, the rotor shaft 4 is connected, for example via a radial shaft sealing, to a pump that serves as a circulation device 11 and that circulates the cooling fluid. As an alternative, the cooling fluid could be supplied also in a different manner to the hollow shaft. For example, oil or another cooling fluid could enter from the interior space of the electric machine into the hollow shaft via an opening in the hollow shaft. A circulation device is not required. It is also possible that the cooling fluid is circulated only by the effect of the centrifugal force acting via the cooling channels 7, 8 due to the rotation of the rotor.

The supplying of the cooling fluid to the channel 9 is carried out, as shown by the arrow 13, via a groove in the rotor shaft 4. When the groove 14 is provided, a cooling fluid line is created in a circumferential section of the rotor 3 between the rotor shaft 4 and the sheet meal packet 5, through which the cooling fluid is supplied to the cooling channel 9. The cooling channel 9 conducts the cooling fluid in the gap 16 between the rotor 3 and stator 2. In order to improve the circulation of the cooling fluid, the cooling fluid is suctioned off from this gap by the circulation device 52 and a blower, which is indicated by the arrow 15.

The cooling channel 10 extends only through one of the short-circuit rings 6. The circulation of the cooling fluid takes place exclusively so that the rotor rotates and conducts the cooling fluid under the influence of centrifugal force in the cooling channel 10 to the outer jacket surface of the short-circuit ring 6. The result is that a negative pressure is generated in the region of the inner surface of the jacket of the of the short-circuit ring 6, which siphons off the cooling fluid from this area.

Various possibilities for realizing cooling channels corresponding to the cooling channels 7 through 10 illustrated in FIG. 1 in other electric machines will be next explained in the following with reference to FIG. 2 through 6.

Figure 2:
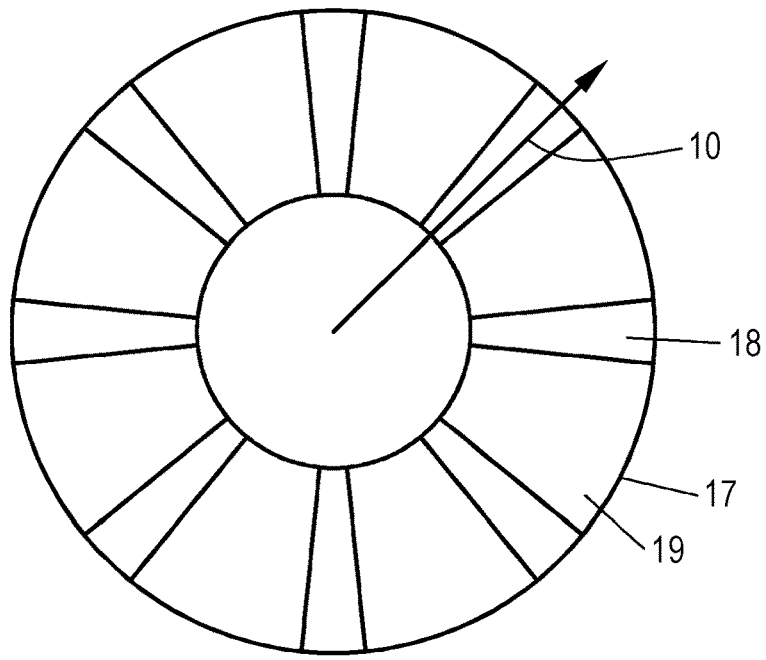
FIG. 2 shows one of a plurality of the disks of a short-circuit ring in the electric machine according to FIG. 1.

FIG. 2 shows one of several disks, in particular two disks, from the short-circuit ring 6 shown in FIG. 1, which can be built in order to realize the cooling means channel 10. The surface of the channel 17 is provided with elevated regions 19 alternating in the circumferential direction with recessed regions 18. The recessed regions 18 can be created for example by machining, or the disk 17 can be already manufactured in this manner so that its surface is provided with elevated and recessed regions 18, 19. When a plurality of the disks 17 are correspondingly designed with the disks 17 shown in FIG. 1 so that the surfaces are stacked on top of each other and suitably arranged, respective pairs of recessed region 18 of the disks form the cooling channels 10.

Figure 3:
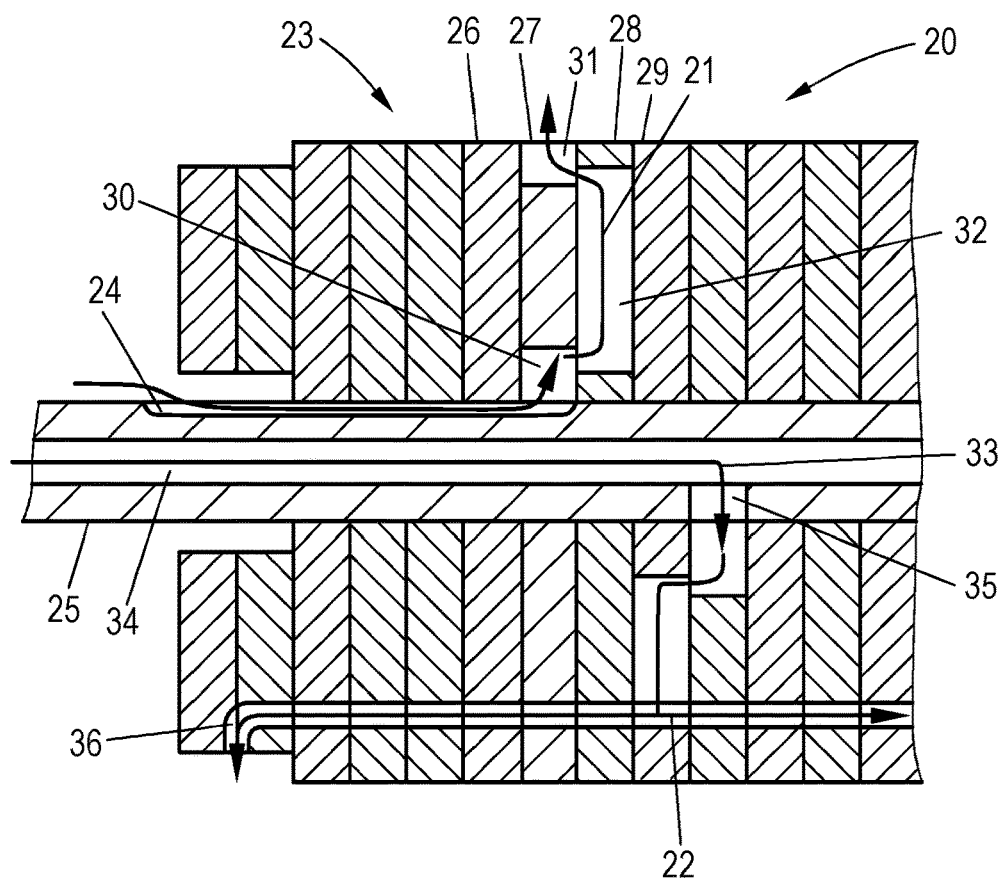
FIG. 3 shows a rotor of another embodiment of an electric machine according to the invention, which is produced according to an embodiment of the method according to the invention.

FIG. 3 shows a rotor 20 which is provided with cooling channels 21, 22 that are similar to those of the rotor 3 shown in FIG. 1. The cooling means channel 21 supplies in particular a gaseous fluid from an inner jacket surface of the metal sheet packet 23 to an outer jacket surface of the sheet metal packet 23. The cooling fluid is thus supplied in this manner by means of a groove 24 to the rotor shaft 25.

The cooling channel is delimited by four sheet metal plates 26, 27, 28, 29 of the sheet metal packet 23. In this case, the sheet metal plates 27, 28 are provided with perforations 30, 31, 32, through which the cooling fluid can flow. Since the perforations 30, 31 of the sheet metal plate 27 are respectively overlapped in radial and circumferential direction by a section of the perforation 32, a continuous cooling channel 21 is formed.

The cooling channel 22 is also formed by several sheet metal plates of the sheet metal packet 23 which are provided in the radial and circumferential direction of the rotor with overlapping perforations. As indicated by the arrow 33, the cooling fluid is conducted via the cooling fluid line 34 to the cooling channel 22, which is formed so that the rotor shaft 25 is designed as a hollow shaft. The coolant is supplied through an opening 35 in the rotor shaft 22, in particular as a fluid coolant, to the inner jacket side of the cooling channel 22. The cooling fluid is first guided substantially radially outward in the cooling channel 22 before it enters an axially extended portion of the cooling channel 22, which passes axially through the sheet metal packet 23. The cooling fluid is conducted through this section of the cooling channel to a recess of the short-circuit in order to provide additional cooling.

The recesses of the sheet metal packet 23, which accommodate the current-conducting elements, are located outside of the cutting plane and therefore they are not indicated in the illustration.

For reasons of clarity, the individual cooling channels 21, 22 are illustrated in FIG. 3 so that they extend only in axial direction and in radial direction. To achieve better cooling of the rotor, it can be advantageous if at least parts of the cooling channel are also provided with sections extending in the circumferential direction. An example of this will be explained next with reference to FIG. 4 through FIG. 6.

Figure 4:
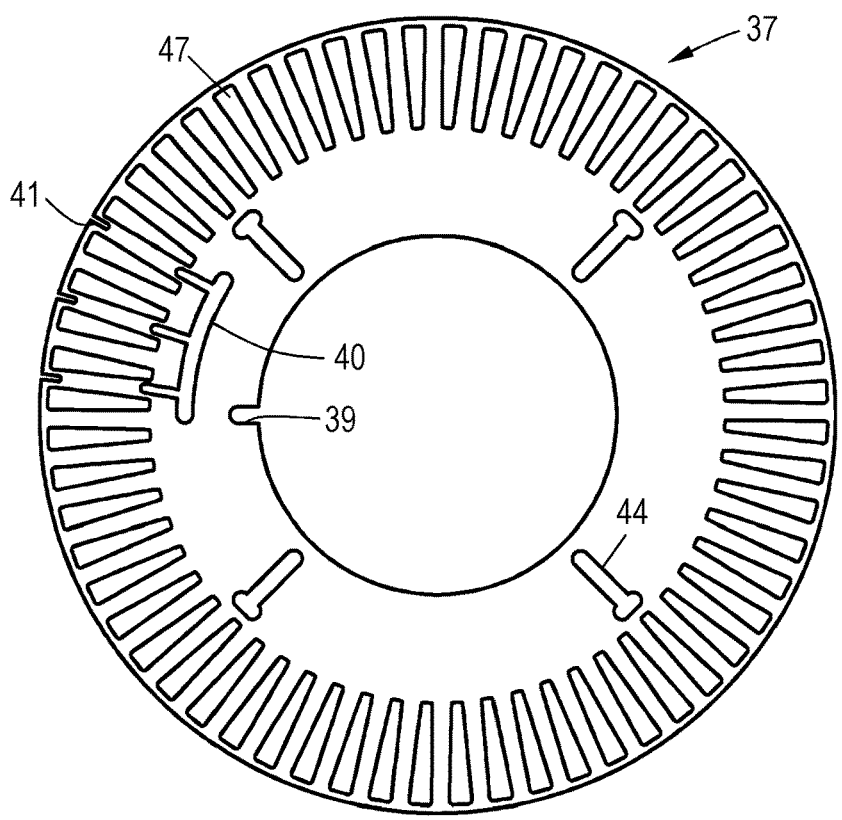
FIG. 4 shows a sheet metal plate which can be used in another embodiment of the method according to the invention in order to manufacture the rotor of another embodiment of the electric machine according to the invention.
Figure 5:
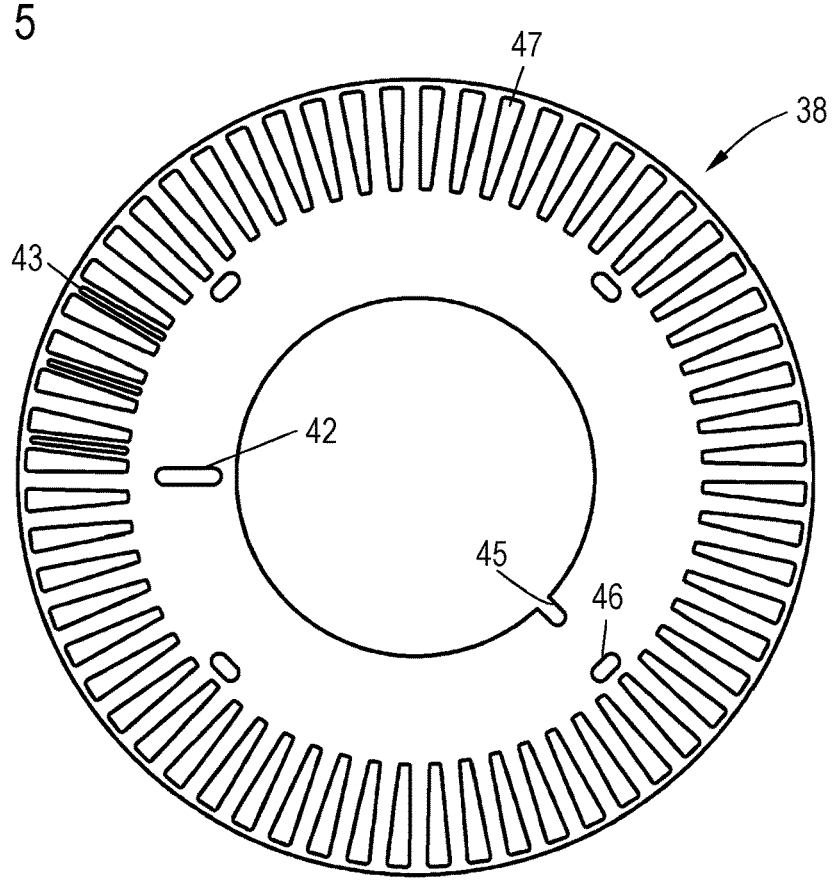
FIG. 5 shows another sheet metal plates which can be used in another embodiment of the method according to the invention in order to manufacture the rotor of another embodiment of the electric machine according to the invention.

FIGS. 4 and 5 shows respectively sheet metal plates 37, 38. When the sheet metal plates 37, 38 are stacked up on a sheet metal packet arranged on a rotor shaft, the cooling means channels are formed with a plurality of perforations 39 through 46 of the sheet metal plates 37, 38.

Figure 6:
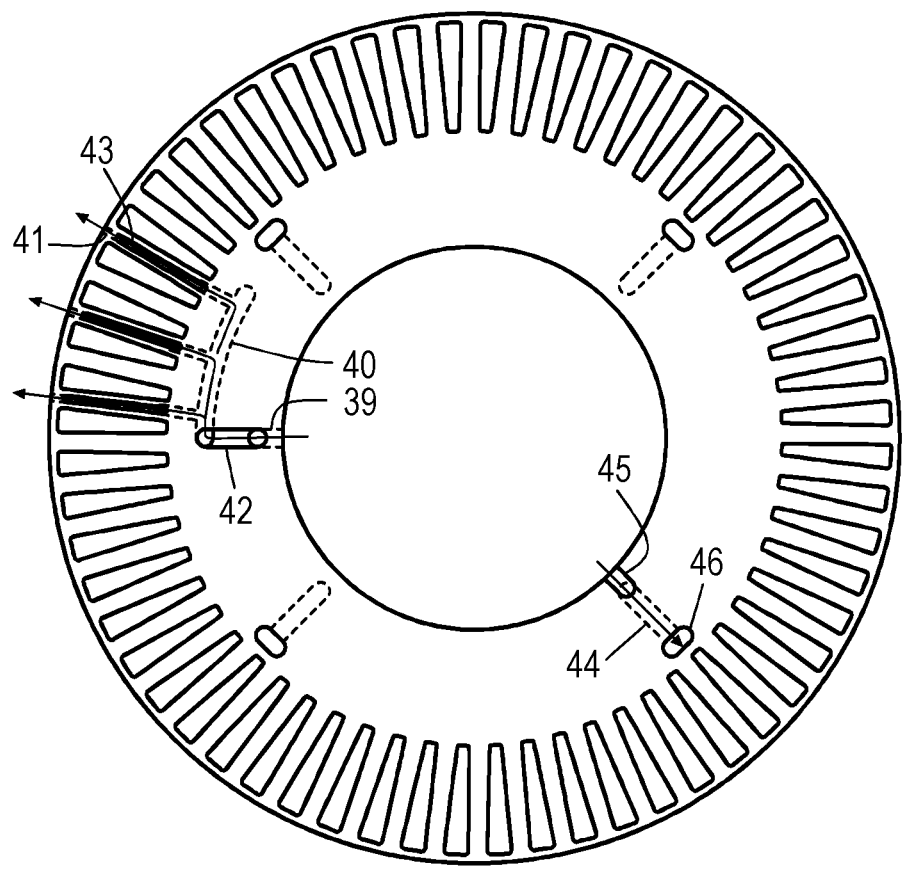
FIG. 6 shows a superimposed representation of the sheet metal plates according to FIGS. 4 and 5 for illustration of the development of the cooling channels.

This can be seen for example in FIG. 6 which shows the superimposition of both sheet metal plates 37, 28, wherein the perforations in the sheet metal plate 37 are indicated by dashed lines and the development of the cooling channels is illustrated by the arrows.

The sheet metal packet may be formed for example in such a way that a sheet metal plate 37 and a sheet metal plate 38 are stacked alternately so that with each repetition of the pair of the sheet metal plates 37, 38, the next sheet metal plates 37, 38 are rotated by 90°. The result is that the cooling channels are formed in more circumferential segments of the sheet metal packet. It is of course also possible that instead of an individual sheet metal plate 37, 38, a stack of a plurality of sheet metal plates 37, 38, which are oriented in the same direction, are respectively used in order to increase the expansion of the individual cooling channels in the axial direction.

A cooling channel, which extends from an inner jacket surface of the resulting sheet metal packet to the outer jacket surface of this sheet metal packet, is formed by the perforations 39, 40, 41 of the sheet metal plate 37 and by the perforations 42, 43 of the sheet metal plate 38. As shown in FIG. 6, the recess 42 of the sheet metal plate 38 overlaps the recesses 39, 40 of the sheet metal plate 37. A continuous cooling channel is thus formed in this manner from the inner jacket surface to the outer jacket surface of the sheet metal packet.

The second cooling channel is formed by the perforation 44 of the sheet metal 37 and by the perforations 45, 46 of the sheet metal 38. As shown in FIG. 6, the perforation 44 overlaps the perforations 45, 46 of the sheet metal plate 38. A cooling channel is thus formed in radial direction, which extends from the inner jacket surface of the sheet metal packet to the perforation 46. Since the perforations 44, 46 are provided so that they are shifted four times by 90° in the sheet metal plates 37, 38, this results in the arrangement described above, wherein the pairs of the sheet metal plates 37, 38 are rotated in each case by 90°, and with the overlapping of the perforations 44, 46, a continuous cooling means channel is formed in the axial direction, which extends up to the end of the sheet metal package.

The cooling means supplied to the inner jacket surface can thus stream out on the axial side, or stream in into a cooling means channel of a short-circuit ring.

Both sheet metal plates 37, 38 are provided with a plurality of perforations 47, which as can be seen in FIG. 6, form continuous recesses that are continuous in the axial direction. A respective current-conducting element is introduced into these recesses during the manufacturing of the rotor. For example, prefabricated current-conducting bars can be inserted in them, or these recesses can be filled with a conductive material. The current-conducting elements guided by the perforations 47 can then be conductively connected by placing short-circuit rings on the sheet metal packet to complete the production of the sheet metal packet.

Figure 7:
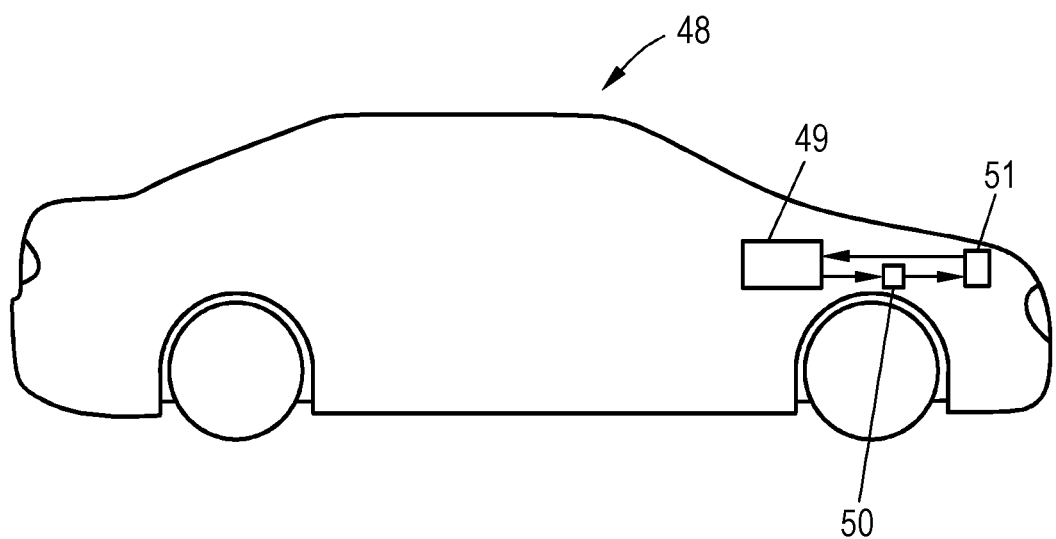
FIG. 7 shows an embodiment of a motor vehicle according to the invention.

The illustrated electric machine can be used for example in a motor vehicle 48 as shown in FIG. 7. The electric machine 49 corresponds substantially to the electric machine 1 shown in FIG. 1, wherein instead of a circulation device 11 deployed inside the electric machine 1, a pump 50 is provided in the motor vehicle 48, which is arranged on the electric machine 49. The pump 50 pumps a fluid coolant, for example oil, which is connected in a lower region of the electric machine 49 by means of a heat exchanger 51, in which oils is cooled by ambient air. After that, the cooled oil is conducted back to the electric machine 49. It is then guided via a hollow shaft of the electric machine 49 into the interior of the rotor, where it is guided through the rotor to cool it, as shown in FIG. 1 with respected to the cooling channels 7, 8.

The invention claimed is:

1. An electric machine, comprising:
   a stator and a rotor, wherein the rotor has a sheet metal packet attached to a rotor shaft of the electric machine with sheet metal plates stacked in the axial direction of the rotor, wherein the sheet metal packet forms a first at least one cooling channel for a cooling fluid, wherein the first at least one cooling channel is formed in such a manner that a plurality of sheet metal plates are provided with at least one respective perforation in the axial direction of the rotor, wherein the first at least one cooling channel extends at least in sections in the radial direction of the rotor, wherein the section of the first at least one cooling channel extending in the radial direction of the rotor or at least one of these sections is formed by one of the perforations of the sheet metal plates, and
   at least one short circuit ring arranged on an axial side of the sheet metal packet forms a second at least one cooling channel for a cooling fluid, which extends at least in sections in the radial direction of the rotor,
   wherein the short circuit ring comprises at least two axially adjacent disks which delimit the second at least one cooling channel.

2. The electric machine according to claim 1, wherein the cooling channel is delimited by at least two sheet metal plates of the sheet metal packet.

3. The electric machine according to claim 2, wherein at least two of the sheet metal plates mutually differ with respect to the number and the form and the position and the orientation of at least parts of their perforations from each other, wherein the cooling channel is formed by perforations of these sheet metal plates.

4. The electric machine according to claim 1, wherein the cooling channel extends from an internally arranged radially inner jacket surface of the sheet metal packet or of the short-circuit ring to an externally arranged outer jacket surface of the sheet metal packet or of the short-circuit ring.

5. The electric machine according to claim 1, wherein a cooling fluid line extending in the axial direction is formed within the rotor shaft and between the rotor shaft and the sheet metal packet and within the sheet metal packet, by which the cooling fluid can be supplied to the cooling channel.

6. The electric machine according to claim 1, further comprising a circulating device, by which the cooling fluid can be circulated through the cooling channel.

7. The electric machine according to claim 1, wherein at least two cooling channels or groups of cooling channels are provided, through which cooling fluids that are mutually different from each other can be provided.

* * * * *